US010149270B2

(12) United States Patent
Zhang

(10) Patent No.: US 10,149,270 B2
(45) Date of Patent: Dec. 4, 2018

(54) METHOD AND DEVICE FOR POSITIONING USER EQUIPMENT, AND SYSTEM

(71) Applicant: Huawei Technologies Co., Ltd., Shenzhen (CN)

(72) Inventor: Yi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/395,510

(22) Filed: Dec. 30, 2016

(65) Prior Publication Data

US 2017/0111881 A1    Apr. 20, 2017

Related U.S. Application Data

(63) Continuation of application No. PCT/CN2014/081131, filed on Jun. 30, 2014.

(51) Int. Cl.
  *H04W 64/00* (2009.01)
  *H04B 17/318* (2015.01)
  *H04W 72/04* (2009.01)

(52) U.S. Cl.
  CPC .......... *H04W 64/00* (2013.01); *H04B 17/318* (2015.01); *H04W 64/003* (2013.01); *H04W 72/0413* (2013.01)

(58) Field of Classification Search
  CPC ....... H04W 64/00; H04W 4/008; H04W 4/02; H04W 64/003; H04W 72/085; H04B 17/318
  See application file for complete search history.

(56) References Cited

U.S. PATENT DOCUMENTS

2006/0061476 A1  3/2006 Patil et al.
2007/0104295 A1* 5/2007 Kriz .................. H04L 27/14
                                                    375/334

(Continued)

FOREIGN PATENT DOCUMENTS

CN   101772159 A   7/2010
CN   101902684 A   12/2010

(Continued)

OTHER PUBLICATIONS

Machine Translation and Abstract of Chinese Publication No. CN101772159, Jul. 7, 2010, 11 pages.

(Continued)

*Primary Examiner* — Magdi Elhag
(74) *Attorney, Agent, or Firm* — Conley Rose, P.C.

(57) ABSTRACT

A method, device and system for positioning user equipment (UE). The method is applied to a communications system including a location card, a signal transmitter and a reader. The location card and the signal transmitter are in a one-to-one correspondence, a distance between the location card and the signal transmitter corresponding to the location card is less than a preset value, and the method includes detecting, by the location card, an uplink signal sent by UE, and generating, by the location card, a first signal according to the uplink signal, and sending the first signal to the reader such that the reader determines a location of the UE according to the first signal and a location of the location card. The method not only simplifies a method for positioning UE in other approaches, but also improves accuracy of UE positioning.

17 Claims, 7 Drawing Sheets

(56) References Cited

U.S. PATENT DOCUMENTS

| | | | |
|---|---|---|---|
| 2007/0296633 A1 | 12/2007 | Yanagihara | |
| 2008/0143482 A1* | 6/2008 | Shoarinejad | G01S 7/003 340/10.1 |
| 2008/0240013 A1* | 10/2008 | Johnson | H04W 52/44 370/315 |
| 2010/0068680 A1 | 3/2010 | Quintilio | |
| 2010/0309051 A1 | 12/2010 | Moshfenghi | |
| 2011/0190005 A1 | 8/2011 | Cheon et al. | |
| 2012/0322501 A1* | 12/2012 | Abouzid | G01S 5/02 455/552.1 |

FOREIGN PATENT DOCUMENTS

| | | |
|---|---|---|
| CN | 102045839 A | 5/2011 |
| CN | 103517407 A | 1/2014 |
| CN | 103533533 A | 1/2014 |
| JP | 2004112482 A | 4/2004 |
| JP | 2006262042 A | 9/2006 |
| JP | 2007306540 A | 11/2007 |
| JP | 2008193626 A | 8/2008 |
| JP | 2014179717 A | 9/2014 |
| WO | 2012053767 A2 | 4/2012 |

OTHER PUBLICATIONS

Machine Translation and Abstract of Chinese Publication No. CN101902684, Dec. 1, 2010, 15 pages.

Machine Translation and Abstract of Chinese Publication No. CN102045839, May 4, 2011, 14 pages.

Foreign Communication From a Counterpart Application, European Application No. 14896907.4, Extended European Search Report dated Jun. 12, 2017, 7 pages.

Foreign Communication From a Counterpart Application, PCT Application No. PCT/CN2014/081131, English Translation of International Search Report dated Dec. 30, 2014, 2 pages.

Foreign Communication From a Counterpart Application, PCT Application No. PCT/CN2014/081131, English Translation of Written Opinion dated Dec. 30, 2014, 8 pages.

Machine Translation and Abstract of Japanese Publication No. JP2004112482, Apr. 8, 2004, 42 pages.

Machine Translation and Abstract of Japanese Publication No. JP2006262042, Sep. 28, 2006, 9 pages.

Machine Translation and Abstract of Japanese Publication No. JP2008193626, Aug. 21, 2008, 22 pages.

Machine Translation and Abstract of Japanese Publication No. JP2014179717, Sep. 25, 2014, 22 pages.

Foreign Communication From a Counterpart Application, Japanese Application No. 2016-573466, Japanese Notice of Allowance dated Dec. 5, 2017, 3 pages.

Foreign Communication From a Counterpart Application, Japanese Application No. 2016-573466, English Translation of Japanese Notice of Allowance dated Dec. 5, 2017, 4 pages.

Machine Translation and Abstract of Chinese Publication No. CN103517407, Jan. 15, 2014, 23 pages.

Foreign Communication From a Counterpart Application, Chinese Application No. 201480031526.4, Chinese Search Report dated Mar. 12, 2018, 2 pages.

Foreign Communication From a Counterpart Application, Chinese Application No. 201480031526.4, Chinese Office Action dated Mar. 20, 2018, 10 pages.

\* cited by examiner

METHOD AND DEVICE FOR POSITIONING USER EQUIPMENT, AND SYSTEM

CROSS-REFERENCE TO RELATED APPLICATIONS

This application is a continuation of International Patent Application No. PCT/CN2014/081131 filed on Jun. 30, 2014. The disclosure of which is hereby incorporated by reference in its entirety.

TECHNICAL FIELD

The present disclosure relates to the field of communications technologies, and in particular, to a method and device for positioning user equipment (UE), and a system.

BACKGROUND

In order to solve a UE positioning problem, particularly, indoor positioning of UE, the industry carries out a large quantity of research, such as research on positioning technologies based on network assisted Global Positioning System (GPS), pseudo-satellite, wireless local area network (WLAN), and BLUETOOTH (BT). In these technologies, some technologies are mainly used for navigation and positioning, such as the pseudo-satellite, and some other technologies are mainly used for providing a communications service, but can also provide a positioning service, such as the WLAN.

In an existing communications system, two methods for UE positioning are mainly used, a method for UE positioning based on a channel fingerprint and a method for UE positioning based on measurement. The method for UE positioning based on a channel fingerprint needs to scan channel information of each place in advance, and the workload is huge, while for the method for UE positioning based on measurement, each of multiple antennas can receive an uplink signal of UE, and a distance between the UE and the antenna cannot be accurately identified such that UE positioning is inaccurate.

SUMMARY

Embodiments of the present disclosure provide a method and device for positioning UE, and a system, which can improve accuracy of UE positioning.

A first aspect of the present disclosure provides a method for positioning UE, where the method is applied to a communications system, the communications system includes a location card, a signal transmission point and a reader, and the method includes detecting, by the location card, an uplink signal sent by UE, generating, by the location card, a first signal according to the uplink signal, and sending the first signal to the reader, where the first signal carries identification information of the location card, and the first signal is used for instructing the reader to determine a location of the UE according to the first signal and a location of the location card.

With reference to the first aspect, in a first implementation manner of the first aspect, generating, by the location card, a first signal according to the uplink signal includes generating, by the location card, a first pulse signal according to the uplink signal, and generating, by the location card, the first signal according to the first pulse signal and the identification information of the location card.

With reference to the first aspect or the first implementation manner of the first aspect, in a second implementation manner of the first aspect, the first signal is a pulse signal, and a relationship between a pulse amplitude of the first signal and a signal strength of the uplink signal is a preset proportional relationship.

With reference to the first aspect or any one of the foregoing implementation manners, in a third implementation manner of the first aspect, the method further includes receiving, by the location card, an indication signal sent by the reader, where the indication signal is used for instructing the location card to send a second signal, and sending, by the location card, the second signal to at least one location card except the location card.

With reference to the first aspect or the first implementation manner or the second implementation manner, in a fourth implementation manner of the first aspect, the method further includes receiving, by the location card, a second signal sent by another location card, and generating, by the location card, a third signal according to the second signal, and sending the third signal to the reader, where the third signal carries the identification information of the location card and identification information of the other location card, and the third signal is used for instructing the reader to determine, according to an arrival time of the third signal and a sending time of the indication signal, a relative distance between the location card and the other location card.

With reference to the fourth implementation manner of the first aspect, in a fifth implementation manner of the first aspect, generating, by the location card, a third signal according to the second signal includes determining the identification information of the other location card according to the second signal, and generating the third signal according to the identification information of the other location card, the identification information of the location card, and the second signal, or generating the third signal by carrying the identification information of the location card in the second signal, where the second signal carries the identification information of the other location card, where the third signal carries the identification information of the location card and the identification information of the other location card.

With reference to any one of the third to fifth implementation manners of the first aspect, in a sixth implementation manner of the first aspect, the second signal is an ultrasonic wave signal or electromagnetic wave signal.

With reference to the first aspect or any one of the foregoing implementation manners, in a seventh implementation manner of the first aspect, the identification information includes radio frequency identification (RF ID) or cell identification (Cell ID).

A second aspect of the present disclosure provides a method for positioning UE, where the method is applied to a communications system, the communications system includes a location card, a signal transmission point and a reader, and the method includes receiving, by the reader, a first signal sent by the location card, where the first signal is generated by the location card according to an uplink signal sent by UE, and the first signal carries identification information of the location card, and determining, by the reader, a location of the UE according to the first signal and a location of the location card.

With reference to the second aspect, in a first implementation manner of the second aspect, determining, by the reader, a location of the UE according to the first signal and a location of the location card includes determining, by the reader, a first distance between the location card and the UE according to a signal strength of the first signal, and determining the location of the UE according to the first distance and the location of the location card, or obtaining, by the reader, the location of the location card according to the first signal, and determining the location of the UE according to the location of the location card and a location of at least one location card except the location card, where the at least one location card is a location card that successfully detects the uplink signal of the UE and sends, according to the uplink signal, a signal to the reader, or obtaining, by the reader, the location of the location card according to the first signal, and determining the location of the UE according to a movement track of the UE and the location of the location card.

With reference to the second aspect or the first implementation manner of the second aspect, in a second implementation manner of the second aspect, the method further includes sending, by the reader, a notification message to a network side device according to a quantity of location cards that successfully detect the uplink signal and send a signal to the reader according to the uplink signal, where the notification message is used for instructing the network side device to adjust a transmit power of the UE, or sending, by the reader to a network side device, the signal that is sent according to the uplink signal and by the location card that successfully detects the uplink signal such that the network side device adjusts a transmit power of the UE according to the signal sent by the reader.

With reference to the second aspect or any one of the foregoing implementation manners of the second aspect, in a third implementation manner of the second aspect, before receiving, by the reader, a first signal sent by the location card, the method further includes obtaining, by the reader, the location of the location card.

With reference to the third implementation manner of the second aspect, in a fourth implementation manner of the second aspect, obtaining, by the reader, the location of the location card includes sending, by the reader, an indication signal, where the indication signal is used for instructing another location card to send a second signal, receiving, by the reader, a third signal sent by the location card, where the third signal carries the identification information of the location card and identification information of the other location card, and the third signal is generated by the location card according to the second signal sent by the other location card, determining, by the reader, a relative distance between the location card and the other location card according to an arrival time of the third signal and a sending time of the indication signal, and determining, by the reader, the location of the location card according to an actual distance between the other location card and any location card except the location card and the other location card.

With reference to the second aspect or any one of the foregoing implementation manners of the second aspect, in a fifth implementation manner of the second aspect, the method further includes sending, by the reader, location information of the UE to the network side device.

A third aspect of the present disclosure provides a method for positioning UE, where the method includes receiving, by a network side device, an uplink signal sent by UE, determining, by the network side device, channel information of the UE according to the uplink signal, where the channel information includes reference signal received power (RSRP) or channel state information (CSI), and determining, by the network side device, a location of the UE according to the channel information of the UE and a preset correspondence between channel information and location information.

With reference to the second third, in a first implementation manner of the third aspect, determining, by the network side device, a location of the UE according to the channel information of the UE and a preset relationship between channel information and location information includes receiving, by the network side device, location information of the UE sent by a reader, where the location information is determined by the reader according to a first signal sent by a location card, and the first signal is generated by the location card according to the uplink signal sent by the UE, and determining, by the network side device, the location of the UE according to the location information, the channel information of the UE and the preset relationship between channel information and location information.

A fourth aspect of the present disclosure provides a device for positioning UE, where the device is a location card, the location card is applied to a communications system, the communications system further includes a signal transmission point and a reader, and the location card includes a wave detecting unit configured to detect an uplink signal sent by UE, and a first signal generating unit configured to generate a first signal according to the uplink signal detected by the wave detecting unit, and send the first signal to the reader, where the first signal carries identification information of the location card, and the first signal is used for instructing the reader to determine a location of the UE according to the first signal and a location of the location card.

With reference to the fourth aspect, in a first implementation manner of the first fourth, the first signal generating unit includes a pulse generating unit and a tag unit, where the pulse generating unit is configured to generate a first pulse signal according to the uplink signal detected by the wave detecting unit, and the tag unit is configured to generate the first signal according to the first pulse signal generated by the pulse generating unit and the identification information of the location card.

With reference to the fourth aspect or the first implementation manner of the fourth aspect, in a second implementation manner of the fourth aspect, the first signal is a pulse signal, and a relationship between a pulse amplitude of the first signal and a signal strength of the uplink signal is a preset proportional relationship.

With reference to the fourth aspect or any implementation manner of the fourth aspect, in a third implementation manner of the fourth aspect, the location card further includes a first signal receiving unit configured to receive an indication signal sent by the reader, where the indication signal is used for instructing the location card to send a second signal, and a second signal generating unit configured to generate the second signal, and send the second signal to at least one location card except the location card.

With reference to the fourth aspect or the first or second implementation manner of the fourth aspect, in a fourth implementation manner of the fourth aspect, the location card further includes a second signal receiving unit configured to receive a second signal sent by another location card, and a third signal generating unit configured to generate a third signal according to the second signal received by the second signal receiving unit, and send the third signal to the reader, where the third signal carries the identification information of the location card and identification information of the other location card, and the third signal is used for instructing the reader to determine, according to an arrival time of the third signal and a sending time of the indication signal, a relative distance between the location card and the other location card.

With reference to the fourth implementation manner of the fourth aspect, in a fifth implementation manner of the fourth aspect, the third signal generating unit is further configured to determine the identification information of the other location card according to the second signal, and generate the third signal according to the identification information of the other location card, the identification information of the location card, and the second signal, or generate the third signal by carrying the identification information of the location card in the second signal, where the second signal carries the identification information of the other location card, where the third signal carries the identification information of the location card and the identification information of the other location card.

With reference to any one of the third to fifth implementation manners of the fourth aspect, in a sixth implementation manner of the fourth aspect, the second signal is an ultrasonic wave signal or electromagnetic wave signal.

With reference to the fourth aspect or any implementation manner of the fourth aspect, in a seventh implementation manner of the fourth aspect, the identification information includes RF ID or Cell ID.

A fifth aspect of the present disclosure provides a device for positioning UE, where the device is a reader, the reader is applied to a communications system, the communications system further includes a location card and a signal transmission point, and the reader includes a signal receiving unit configured to receive a first signal sent by the location card, where the first signal is generated by the location card according to an uplink signal sent by UE, and the first signal carries identification information of the location card, and a UE positioning unit configured to determine a location of the UE according to the first signal received by the signal receiving unit and a location of the location card.

With reference to the fifth aspect, in a first implementation manner of the fifth aspect, the UE positioning unit is further configured to determine a first distance between the location card and the UE according to a signal strength of the first signal, and determine the location of the UE according to the first distance and the location of the location card, or obtain the location of the location card according to the first signal, and determine the location of the UE according to the location of the location card and a location of at least one location card except the location card, where the at least one location card is a location card that successfully detects the uplink signal of the UE and sends, according to the uplink signal, a signal to the reader, or obtain the location of the location card according to the first signal, and determine the location of the UE according to a movement track of the UE and the location of the location card.

With reference to the fifth aspect or the first implementation manner of the fifth aspect, in a second implementation manner of the fifth aspect, the reader further includes a first sending unit configured to send a notification message to a network side device according to a quantity of location cards that successfully detect the uplink signal and send a signal to the reader according to the uplink signal, where the notification message is used for instructing the network side device to adjust a transmit power of the UE, or send, to a network side device, the signal that is sent according to the uplink signal and by the location card that successfully detects the uplink signal such that the network side device adjusts a transmit power of the UE according to the signal sent by the reader.

With reference to the fifth aspect or any implementation manner of the fifth aspect, in a third implementation manner of the fifth aspect, the reader further includes a location card positioning unit configured to obtain the location of the location card.

With reference to the third implementation manner of the fifth aspect, in a fourth implementation manner of the fifth aspect, the location card positioning unit is further configured to send an indication signal, where the indication signal is used for instructing another location card to send a second signal, receive a third signal sent by the location card, where the third signal carries the identification information of the location card and identification information of the other location card, and the third signal is generated by the location card according to the second signal sent by the other location card, determine a relative distance between the location card and the other location card according to an arrival time of the third signal and a sending time of the indication signal, and determine the location of the location card according to an actual distance between the other location card and any location card except the location card and the other location card.

With reference to the fifth aspect or any one of the foregoing implementation manners of the fifth aspect, in a fifth implementation manner of the fifth aspect, the reader further includes a second sending unit configured to send location information of the UE determined by the UE positioning unit to the network side device.

A sixth aspect of the present disclosure provides a device for positioning UE, where the device is a network side device, and the network side device includes a receiving unit configured to receive an uplink signal sent by UE, a channel information obtaining unit configured to determine channel information of the UE according to the uplink signal received by the receiving unit, where the channel information includes RSRP or CSI, and a UE positioning unit configured to determine a location of the UE according to the channel information of the UE obtained by the channel information obtaining unit and a preset correspondence between channel information and location information.

With reference to the sixth aspect, in a first implementation manner of the sixth aspect, the UE positioning unit is further configured to receive location information of the UE sent by a reader, where the location information is determined by the reader according to a first signal sent by a location card, and the first signal is generated by the location card according to the uplink signal sent by the UE, and determine the location of the UE according to the location information, the channel information of the UE and the preset relationship between channel information and location information.

A seventh aspect of the present disclosure provides a communications system, including UE, a first location card, a reader and a signal transmission point, where the first location card is configured to receive an uplink signal sent by the UE, generate a first signal according to the uplink signal, and send the first signal to the reader, where the first signal carries identification information of the first location card, and the first signal is used for instructing the reader to determine a location of the UE according to the first signal and a location of the first location card, and the reader is configured to receive the first signal sent by the first location card, and determine the location of the UE according to the first signal and the location of the first location card.

With reference to the seventh aspect, in a first implementation manner of the seventh aspect, the communications system includes a network side device, where the network side device is further configured to receive the uplink signal sent by the UE, determine channel information of the UE according to the uplink signal, and determine the location of the UE according to the channel information of the UE and a preset correspondence between channel information and location information, where the channel information includes RSRP or CSI, or receive location information of the UE sent by the reader, and determine the location of the UE according to the location information, the channel information and a preset relationship between channel information and location information.

With reference to the seventh aspect or the first implementation manner of the seventh aspect, in a second implementation manner of the seventh aspect, the communications system further includes a second location card, where the reader is further configured to send an indication signal, where the indication signal is used for instructing a location card to send a signal. The first location card is further configured to receive the indication signal sent by the reader, and send a second signal to the second location card. The second location card is configured to receive the second signal sent by the first location card, generate a third signal according to the second signal, and send the third signal to the reader, and the reader is further configured to receive the third signal sent by the second location card, determine a relative distance between the first location card and the second location card according to an arrival time of the third signal and a sending time of the indication signal, and determine the location of the first location card according to an actual distance between the first location card and any location card except the second location card.

It can be known from the technical solutions that, a location card detects an uplink signal sent by UE, generates a first signal carrying an identification of the location card according to the uplink signal, and sends the first signal to a reader such that the reader determines a location of the UE according to identification information of the location card carried in the first signal and a location of the location card, which not only can greatly simplify a method for positioning UE in other approaches, but also can identify the location of the UE more accurately.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a signal transmission point may be an active transmission point, such as, an access point (AP), or an indoor small-cell base station, or the signal transmission point may be a passive transmission point, such as, a ceiling antenna in a distributed antenna system (DAS), which is not limited in the present disclosure.

A location card may be a card, module or device, is configured to communicate with a reader, and may be further placed inside or placed outside a signal transmission point, such as, multiple location cards are disposed within a signal coverage range of a signal transmission point, or obviously one location card may be arranged within a signal coverage range of a signal transmission point. Moreover, a quantity of location cards arranged is related to accuracy of UE positioning.

A reader may be a card, module or device, is configured to communicate with a location card and a network side device, and may be further placed inside or placed outside the network side device. Moreover, a reader may communicate with one or more network side devices. The network side device may be further a base station or an access controller (AC) or a base station controller, which is not limited in the present disclosure.

Figure 1:
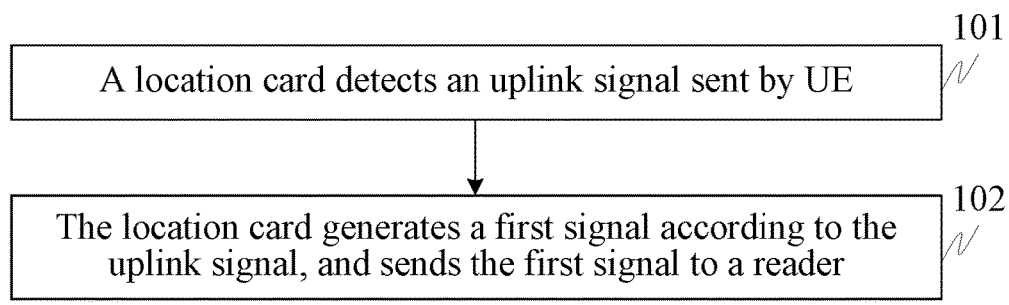
FIG. 1 is a flowchart of a method for positioning UE according to an embodiment of the present disclosure.

As shown in FIG. 1, an embodiment of the present disclosure provides a method for positioning UE, where the method is applied to a communications system, the communications system includes a location card, a signal transmission point and a reader, and the method includes the following steps.

Step 101: The location card detects an uplink signal sent by UE.

Step 102: The location card generates a first signal according to the uplink signal, and sends the first signal to the reader.

The first signal carries identification information of the location card, and the first signal is used for instructing the reader to determine a location of the UE according to the first signal and a location of the location card.

The identification information may include RF ID or Cell ID.

It should be made clear that, a location of a location card may be further determined by means of an on-site test, and be preset in a reader, or may be obtained by a reader by means of exchanging information between the reader and the location card and exchanging information between the location card and another location card, which is not limited herein.

The first signal may be a pulse signal or non-pulse signal that can reflect a strength of the uplink signal of UE, or may be a pulse signal or non-pulse signal whose signal amplitude is fixed, which is not limited herein. For example, the first signal may be a pulse signal whose pulse amplitude is in a preset proportional relationship with a signal strength of the uplink signal, or may be a pulse signal whose pulse amplitude is a preset amplitude.

Further, in step 102, the first signal may be directly generated according to the uplink signal detected by the location card, for example, the first signal is generated by carrying information about the location card in the detected uplink signal.

Further, step 102 may include step 102a and step 102b, which are as follows.

Step 102a: The location card generates a first pulse signal according to the uplink signal.

A relationship between a pulse amplitude of the first pulse signal and the signal strength of the uplink signal sent by the UE may be a preset proportional relationship, that is, the pulse amplitude of the first pulse signal may change with the signal strength of the uplink signal. For example, when the signal strength of the uplink signal increases, the pulse amplitude of the first pulse signal increases, and when the signal strength of the uplink signal decreases, the pulse amplitude of the first pulse signal decreases. Obviously, the pulse amplitude of the first pulse signal may also be a preset amplitude, and the preset amplitude may be set using an external input device.

Step 102b: The location card generates the first signal according to the first pulse signal and the identification information of the location card.

The first signal may be a pulse signal whose pulse amplitude is in a proportional relationship with a signal strength of the uplink signal, or may be a pulse signal whose pulse amplitude is a preset amplitude.

In order to better understand the method provided in this embodiment, description is made as follows using an example.

It is assumed that a location card includes a wave detector, a pulse generator and a surface acoustic wave tag (SAW tag), the wave detector in the location card detects an uplink signal sent by UE, and the pulse generator is controlled to generate first pulse signals according to a detection result of the wave detector, where pulse energies of the first pulse signal may be the same, or may be different, and then, the first pulse signals are sent to a reader through preset reflectors in the SAW tag. A signal sent by the SAW tag to the reader carries an RF ID of the location card.

Further, the reader detects the signal sent by the foregoing location card, and determines which location cards or which location card is closer to the UE according to the detected signal of the location card in order to determine a location of the UE. Certainly, in order to precisely position the location of the UE, on this basis, the location of the UE may be determined by calculating a distance between the UE and the location card or a movement track of the UE.

In the method for positioning UE provided in this embodiment of the present disclosure, a location card detects an uplink signal sent by UE, generates a first signal carrying an identification of the location card according to the uplink signal, and sends the first signal to a reader such that the reader determines a location of the UE according to the first signal and a location of the location card, which not only can greatly simplify a method for positioning UE in other approaches, but also can identify the location of the UE more accurately.

Optionally, in an implementation scenario of this embodiment, the method further includes the following steps.

Step 100a: The location card receives an indication signal sent by the reader, where the indication signal is used for instructing the location card to send a second signal.

The second signal may be an ultrasonic wave signal or electromagnetic wave signal, moreover, the second signal may be uniquely identified using a frequency or an identification.

Step 100b: The location card sends the second signal to at least one location card except the location card.

Steps 100a and 100b and steps 101 and 102 may be performed in no particular order, which is not limited herein.

The second signal may carry a first identification of the location card, and the first identification may be identification information of the foregoing location card, or may be another identification used for identifying the foregoing location card, which is not limited herein.

In the foregoing implementation scenario, a location card sends a second signal to another location card such that the other location card processes the second signal and then sends a processed signal to a reader, and in this way, the reader can determine a distance between the location cards according to the signal, which not only avoids complexity of manually determining the distance between the location cards, but also improves location positioning accuracy of the location cards.

Optionally, in another implementation scenario of this embodiment, the method further includes the following steps.

Step 100c: The location card receives a second signal sent by another location card.

The second signal may be an ultrasonic wave signal or electromagnetic wave signal. The second signal may carry a first identification of the other location card, and the first identification may be identification information of the foregoing another location card, or may be an identification that can uniquely identify the foregoing another location card except the identification information, which is not limited herein.

Step 100d The location card generates a third signal according to the second signal, and sends the third signal to the reader.

The third signal carries the identification information of the location card and identification information of the other location card, and the third signal is used for instructing the reader to determine, according to an arrival time of the third signal and a sending time of the indication signal, a relative distance between the location card and the other location card.

Determining, by the reader, a relative distance between the location card and the other location card according to an arrival time of the third signal and a sending time of the indication signal may be described as follows using an example.

First, by means of signal interaction between the reader and the location card, a time length of signal transmission between the two is obtained, then, by performing steps 100c and 100d, a time length of transmitting a signal sent by the other location card to the reader through the location card is obtained, using a difference between the two, a time length of transmitting the signal between the location card and the other location card may be learned, and then a relative distance between the foregoing two location cards is obtained.

Further, generating, by the location card, a third signal according to the second signal in step 100d may include determining the identification information of the other location card according to the second signal, and generating the third signal according to the identification information of the other location card, the identification information of the location card, and the second signal, or generating the third signal by carrying the identification information of the location card in the second signal, where the second signal carries the identification information of the other location card.

The third signal carries the identification information of the location card and the identification information of the other location card.

For example, the second signal may carry a first identification of the other location card, and the location card determines identification information of the other location card according to the first identification and pre-stored identification information of the location card, and generates the third signal according to the identification information of the other location card, the identification information of the location card and the second signal.

In the foregoing implementation scenario, a location card receives a second signal sent by another location card, and the location card processes the received second signal and then sends a processed signal to a reader such that the reader determines a distance between the location cards according to the second signal.

Figure 2:
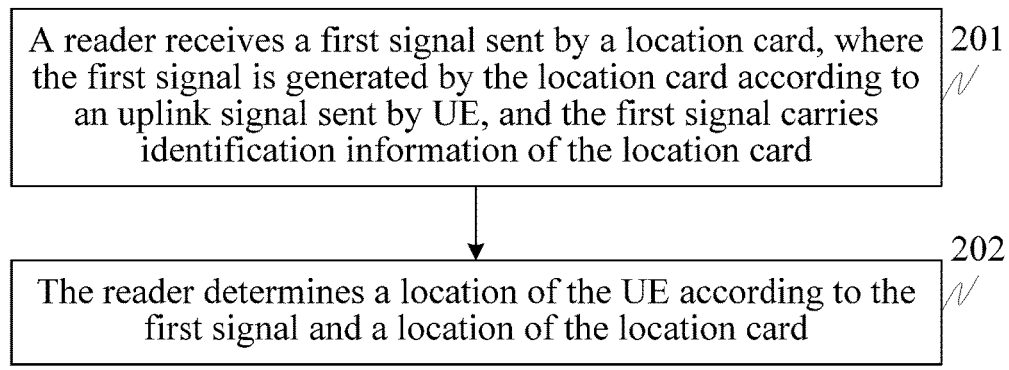
FIG. 2 is a flowchart of another method for positioning UE according to an embodiment of the present disclosure.

As shown in FIG. 2, an embodiment of the present disclosure provides another method for positioning UE, where the method is applied to a communications system, the communications system includes a location card, a signal transmission point and a reader, and the method is further described as follows.

Step 201: The reader receives a first signal sent by the location card, where the first signal is generated by the location card according to an uplink signal sent by UE, and the first signal carries identification information of the location card.

Step 202: The reader determines a location of the UE according to the first signal and a location of the location card.

For the location of the location card, reference may be made to related description in step 102, which is not described again.

Further, step 202 may have the following three implementation manners.

Manner 1: The reader determines a first distance between the location card and the UE according to a signal strength of the first signal, and determines the location of the UE according to the first distance and the location of the location card.

Manner 2: The reader obtains the location of the location card according to the first signal, and determines the location of the UE according to the location of the location card and a location of at least one location card except the location card, where the at least one location card is a location card that successfully detects the uplink signal of the UE and sends, according to the uplink signal, a signal to the reader.

Further, both manner 1 and manner 2 may be applied to a situation in which only the UE sends an uplink signal within a coverage area of a base station or serving cell corresponding to the UE in a preset period of time, for example, a base station corresponds to a reader, only one UE sends an uplink signal within a signal coverage area of the base station in a preset period of time, the reader receives a signal sent according to the uplink signal by a location card, and in this case, the reader determines the location of the UE using the signal sent by the location card and the location of the location card. Moreover, further, whether only one UE sends an uplink signal may be determined according to scheduling information of the base station, which is not described herein again.

Determining the location of the UE according to the location of the location card and a location of at least one location card except the location card in manner 2 belongs to an existing technology, such as, a gravity center method, which is not described again.

Manner 3: The reader obtains the location of the location card according to the first signal, and determines the location of the UE according to a movement track of the UE and the location of the location card.

The movement track of the UE may include a movement direction, a movement speed or the like of the UE, which is not limited. Moreover, manner 3 may be used in a situation in which multiple UEs send uplink signals within a coverage area of a base station or serving cell. For example, a location of UE may be first obtained in manner 1 or manner 2 in step 202 to serve as an initial location of the UE, and the location of the UE is estimated according to a movement track and the initial location of the UE.

In the method for positioning UE provided in this embodiment of the present disclosure, a reader receives a first signal sent by a location card and carrying an identification of the location card, and determines a location of the UE according to the first signal and a location of the location card, which not only can greatly simplify a method for positioning UE in other approaches, but also can identify the location of the UE more accurately.

Optionally, in an implementation scenario of this embodiment, before receiving, by the reader, a first signal sent by the location card, the method further includes the following step.

Step 200: The reader obtains the location of the location card.

Further, step 200 may include sending, by the reader, an indication signal to the location card, where the indication signal is used for instructing another location card to send a second signal, receiving, by the reader, a third signal sent by the location card, where the third signal carries the identification information of the location card and identification information of the other location card, and the third signal is generated by the location card according to the second signal sent by the other location card, determining, by the reader, a relative distance between the location card and the other location card according to an arrival time of the third signal and a sending time of the indication signal, and determining, by the reader, the location of the location card according to an actual distance between the other location card and any location card except the location card and the other location card.

The foregoing indication signal may be sent as follows: the base station sends a message to instruct the reader to send the indication signal, or the reader or signal transmission point triggers sending of the indication signal when detecting the uplink signal of the UE, which are not exemplified again one by one.

The actual distance may be referred to as a physical distance, and the actual distance between any two location cards except the other location card may be obtained by means of on-site measurement, or may be obtained using an actual distance between two location cards except the aforementioned location card, which is not limited.

In the foregoing implementation scenario, a distance between location cards is determined according to a signal transmission time delay between the location cards, and after an actual distance between any two location cards is obtained by means of actual measurement or another existing technology, locations of other location cards may be obtained using the foregoing method, which not only avoids complexity of manually determining a distance between multiple location cards, but also improves positioning accuracy of the location cards, thereby improving accuracy of UE positioning.

Optionally, in another implementation scenario of this embodiment, the method further includes the following step.

Step 203: The reader sends location information of the UE to a network side device.

The location information of the UE may be used in that the network side device associates the location information of the UE with information about a channel occupied by the UE, and may also be used in that the network side device corrects the UE location obtained by the network side device using the location information sent by the reader, which is not limited herein.

The channel information may include RSRP or CSI.

The network side device may be a base station or an access controller or a base station controller, which is not limited herein.

In the foregoing implementation scenario, the reader sends the location information of the UE to the network side device such that the network side device can associate the channel information with the location information and save the association between them, and therefore a subsequent accessed UE can directly determine a location of the subsequent accessed UE according to channel information of a channel occupied by the subsequent accessing UE and the saved association between the channel information and the location information.

Optionally, in still another implementation scenario of this embodiment, after step 202, the method further includes sending, by the reader, a notification message to a network side device according to a quantity of location cards that successfully detect the uplink signal and send a signal to the reader according to the uplink signal, where the notification message is used for instructing the network side device to adjust a transmit power of the UE, or sending, by the reader to a network side device, the signal sent by the location card that successfully detects the uplink signal such that the network side device adjusts a transmit power of the UE according to the signal sent by the reader.

When the quantity of the foregoing location cards that successfully detect the uplink signal is less than a preset first threshold, a message may be sent to notify the network side device to increase the transmit power of the UE such that more location cards detect the uplink signal of the UE, thereby improving accuracy of UE location positioning. When the quantity of the foregoing location cards that successfully detect the uplink signal is greater than a preset second threshold, a message may be sent to notify the network side device to reduce the transmit power of the UE in order to reduce the quantity of the location cards that detect the uplink signal of the UE, thereby avoiding a problem of an increased interference caused by sending signals by excessive location cards. Obviously, the reader may directly send a signal to the network side device, and the network side device determines whether the transmit power of the UE needs to be adjusted, and how to adjust the transmit power.

Figure 3:
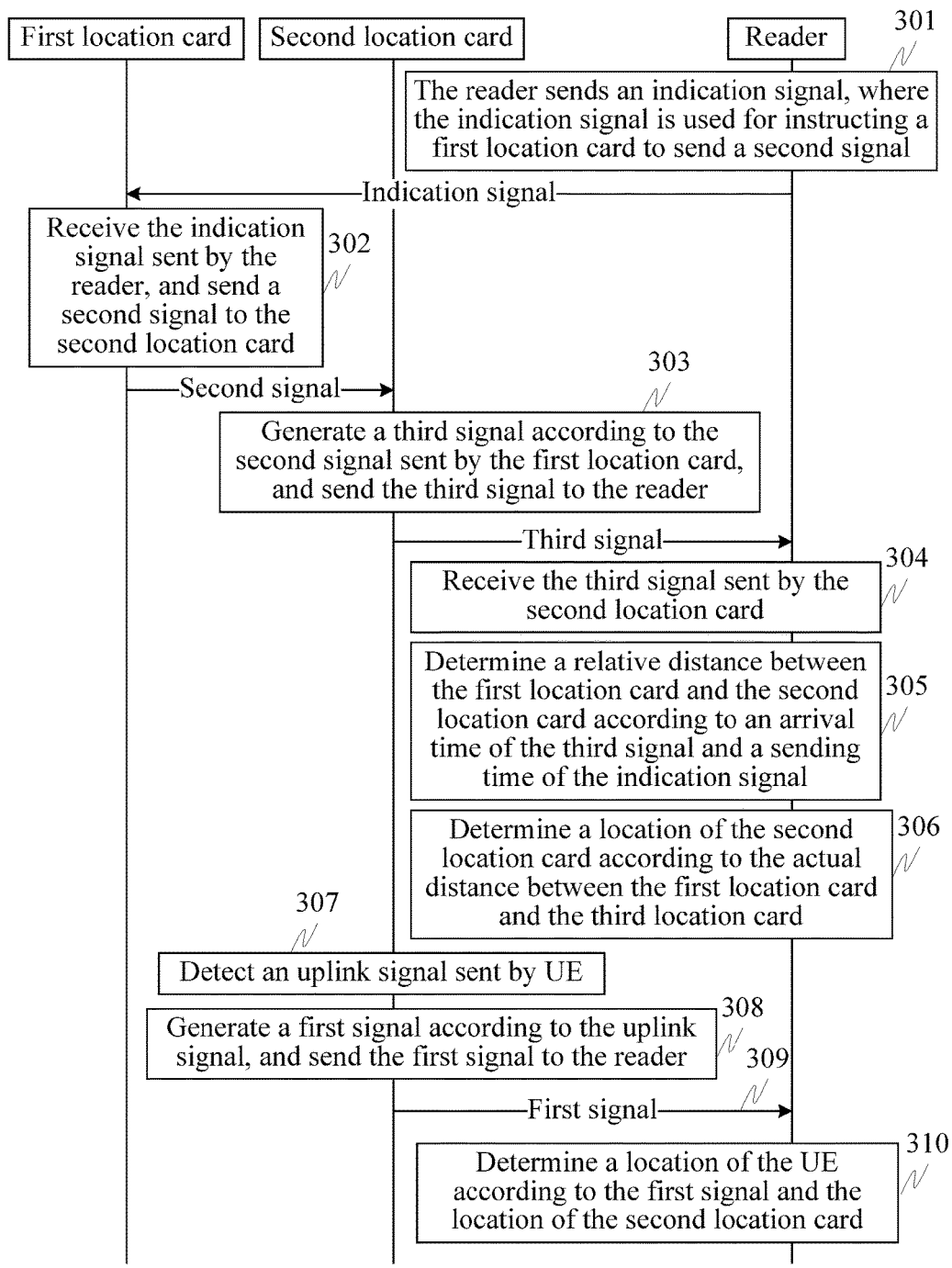
FIG. 3 is a flowchart of still another method for positioning UE according to an embodiment of the present disclosure.

As shown in FIG. 3, an embodiment of the present disclosure provides still another method for positioning UE, where the method is applied to a communications system, and the communications system includes a location card, a signal transmission point and a reader. An example in which location cards at least include a first location card, a second location card and a third location card and an actual distance between the first location card and the third location card is learned is used below to perform description, which is described as follows.

Step 301: The reader sends an indication signal, where the indication signal is used for instructing a first location card to send a second signal.

The second signal may be an ultrasonic wave signal or electromagnetic wave signal, and the second signal may be uniquely identified using a frequency or an identification. The foregoing location cards may be all location cards in a signal coverage area of the reader.

Step 302: The first location card receives the indication signal sent by the reader, and sends a second signal to the second location card.

Step 303: The second location card generates a third signal according to the second signal sent by the first location card, and sends the third signal to the reader.

The third signal carries identification information of the first location card and identification information of the second location card, and the third signal is used for instructing the reader to determine, according to an arrival time of the third signal and a sending time of the indication signal, a relative distance between the first location card and the second location card.

Further, step 303 may include determining the identification information of the first location card according to the second signal sent by the first location card, and generating the third signal according to the identification information of the first location card, the identification information of the second location card and the second signal, or generating the third signal by carrying the identification information of the second location card in the second signal, where the second signal carries the identification information of the first location card.

The third signal carries the identification information of the first location card and the identification information of the second location card.

For example, the second signal carries the identification information of the first location card, and the identification information of the second location card is carried in the second signal, to generate the third signal. For another example, the second location card identifies the first location card using a frequency of the second signal, and the identification information of the first location card and the identification information of the second location card are carried in the second signal, to generate the third signal.

For details of the determining a relative distance between the first location card and the second location card according to an arrival time of the third signal and a sending time of the indication signal, reference may be made to related description in step 100*d*.

Step 304: The reader receives the third signal sent by the second location card.

Step 305: The reader determines a relative distance between the first location card and the second location card according to an arrival time of the third signal and a sending time of the indication signal.

For details of step 305, reference may be made to related description in step 100*d*.

Step 306: The reader determines a location of the second location card according to the actual distance between the first location card and the third location card.

The actual distance between the first location card and the third location card may be obtained by means of actual measurement, and is preset in the reader, and a manner of obtaining the actual distance is not limited herein.

For example, in step 306, the location of the second location card may be determined according to a topology diagram of the location cards and the actual distance between the first location card and the third location card.

Step 307: The second location card detects an uplink signal sent by UE.

Step 308: The second location card generates a first signal according to the uplink signal, and sends the first signal to the reader.

The first signal carries the identification information of the second location card, and the identification information includes an RF ID or a Cell ID.

For the specific implementation manner of step 308, reference may be made to related description in step 102, which is not described again.

Step 309: The reader receives the first signal sent by the second location card.

Step 310: The reader determines a location of the UE according to the first signal and the location of the second location card.

For the specific implementation manner of step 301, reference may be made to related description in step 202.

In the method for positioning UE provided in this embodiment of the present disclosure, a signal is sent between location cards to determine a location of a location card, thereby reducing complexity of determining the location of the location card, an uplink signal sent by UE triggers the location card whose location is determined to send a signal to a reader such that the reader positions the UE according to the received signal and the location of the location card whose location is determined, thereby reducing complexity of positioning the UE.

Figure 4:
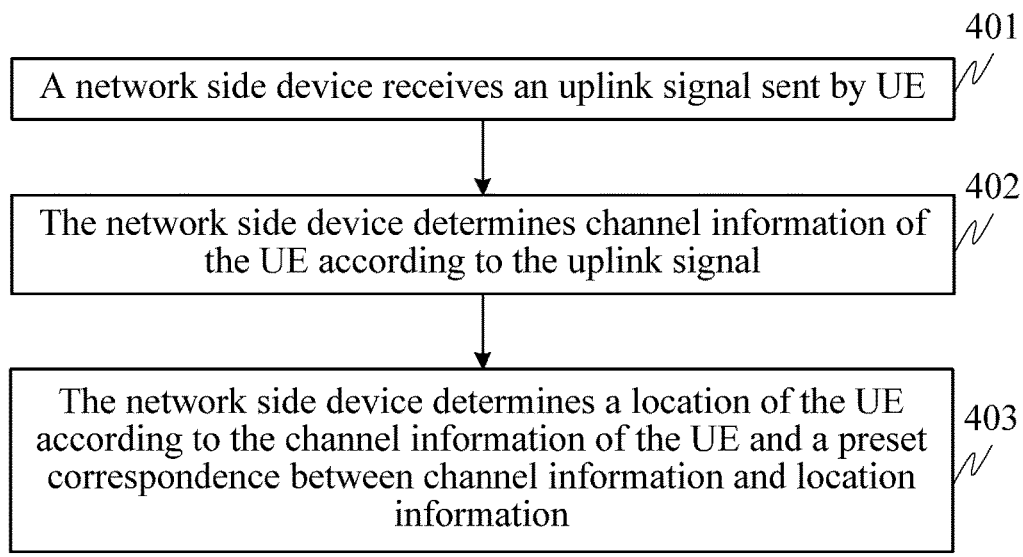
FIG. 4 is a flowchart of still another method for positioning UE according to an embodiment of the present disclosure.

As shown in FIG. 4, an embodiment of the present disclosure provides still another method for positioning UE, where the method is performed by a network side device, which is described as follows.

Step 401: The network side device receives an uplink signal sent by UE.

Step 402: The network side device determines channel information of the UE according to the uplink signal.

The channel information may include RSRP or CSI.

Step 403: The network side device determines a location of the UE according to the channel information of the UE and a preset correspondence between channel information and location information.

For example, after obtaining the channel information of the UE, a base station finds corresponding location information according to the preset correspondence between channel information and location information, and the corresponding location information may serve as location information of the foregoing UE.

Optionally, step 403 may further include step 403*a* and step 403*b*.

Step 403*a*: The network side device receives location information of the UE sent by a reader.

The location information may be determined by the reader according to a first signal sent by a location card, that is, obtained using the method shown in FIG. 3. The first signal is generated by the location card according to the uplink signal sent by the UE, which is not described herein again.

It should be noted that, for details of the location card and the reader, reference may be made to related description in the embodiment shown in FIG. 1.

Step 403*b*: The network side device determines the location of the UE according to the location information sent by the reader, the channel information of the UE and the preset relationship between channel information and location information.

For example, a table of the preset correspondence between channel information and location information is searched according to the channel information of the UE, to obtain location information of the UE. Then the location information of the UE obtained by means of search is corrected according to location information sent by the reader. The correction manner may be further an average method, which belongs to an existing technology.

It should be noted that, the preset correspondence between channel information and location information in step 403 may be obtained by associating the location information of the UE reported by the reader with the channel information and saving the association.

In the method for positioning UE provided in this embodiment of the present disclosure, a network side device determines channel information of UE according to an uplink signal of the UE, and then determines a location of the UE according to the channel information of the UE and a preset correspondence between channel information and location information, and the method further simplifies the method for positioning UE in the prior art.

By separately using a location card, a reader or a network side device as an example below in embodiments in FIG. 5A, FIG. 5B, FIG. 5C, FIG. 6A, FIG. 6B, FIG. 6C, and FIG. 7, and embodiments in FIG. 9, FIG. 10, and FIG. 11, a device for positioning UE is described.

Figure 5A:
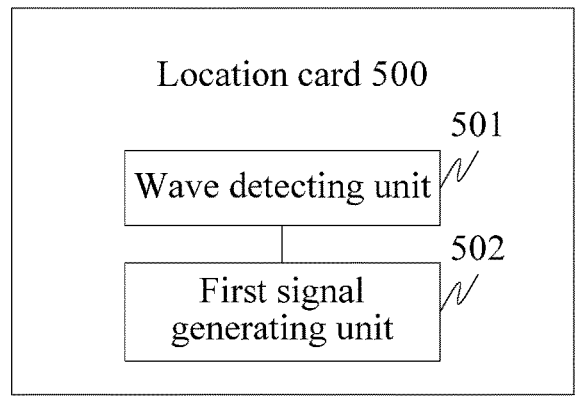
FIG. 5A is a structural block diagram of a location card according to an embodiment of the present disclosure.

As shown in FIG. 5A, an embodiment of the present disclosure provides a location card 500, where the location card 500 is applied to a communications system, the communications system further includes a signal transmission point and a reader, and the location card 500 includes a wave detecting unit 501, and a first signal generating unit 502.

The wave detecting unit 501 is configured to detect an uplink signal sent by UE.

The first signal generating unit 502 is configured to generate a first signal according to the uplink signal detected by the wave detecting unit 501, and send the first signal to the reader.

The first signal carries identification information of the location card 500, and the first signal is used for instructing the reader to determine a location of the UE according to the first signal and a location of the location card 500. For specific description of the first signal, reference may be made to related description in the embodiment shown in FIG. 1, which is not described again.

It should be noted that, the foregoing wave detecting unit 501 may be further a wave detector.

Optionally, the first signal generating unit 502 may include a pulse generating unit (not shown) and a tag unit (not shown), which are further described as follows.

The pulse generating unit is configured to generate a first pulse signal according to the uplink signal detected by the wave detecting unit 501.

The tag unit is configured to generate the first signal according to the first pulse signal generated by the pulse generating unit and the identification information of the location card.

The foregoing pulse generating unit may be further a pulse generator, and the foregoing tag unit may be further a SAW tag. That is, the uplink signal of the UE is detected using the wave detector, the pulse generator is controlled to generate a pulse signal according to an output signal of the wave detector, and then the generated pulse signal is sent to the reader using the SAW tag.

A relationship between a pulse amplitude of the first signal and a signal strength of the uplink signal may be a preset proportional relationship. The first signal may be a pulse signal, and a relationship between a pulse amplitude of the first signal and a signal strength of the uplink signal may likewise be a preset proportional relationship.

Figure 5B:
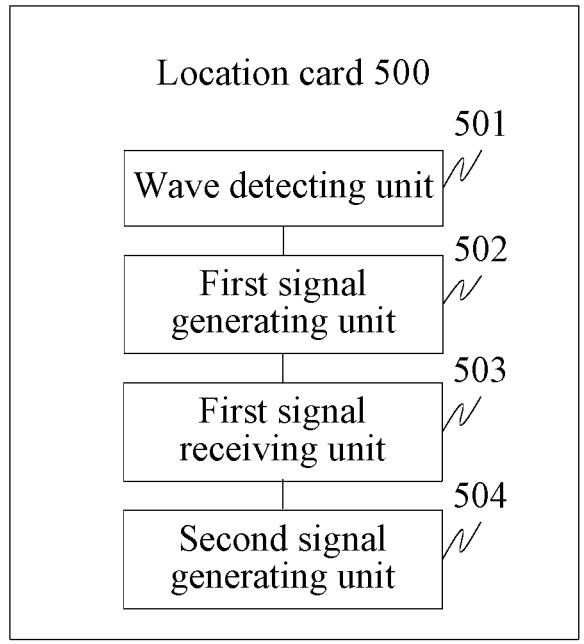
FIG. 5B is a structural block diagram of another location card according to an embodiment of the present disclosure.

Optionally, as shown in FIG. 5B, the location card 500 further includes a first signal receiving unit 503, and a second signal generating unit 504.

The first signal receiving unit 503 is configured to receive an indication signal sent by the reader, where the indication signal is used for instructing the location card 500 to send a second signal.

The second signal generating unit 504 is configured to generate the second signal, and send the second signal to at least one location card except the location card 500.

Figure 5C:
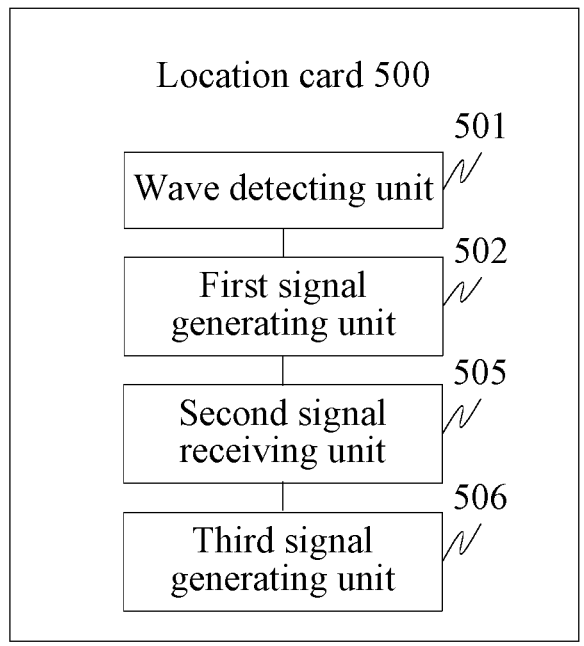
FIG. 5C is a structural block diagram of still another location card according to an embodiment of the present disclosure.

Optionally, as shown in FIG. 5C, the location card 500 further includes a second signal receiving unit 505 configured to receive a second signal sent by another location card, and a third signal generating unit 506 configured to generate a third signal according to the second signal, and send the third signal to the reader.

The third signal carries the identification information of the location card 500 and identification information of the other location card, and the third signal is used for instructing the reader to determine, according to an arrival time of the third signal and a sending time of the indication signal, a relative distance between the location card 500 and the other location card.

For determining, by the reader, a relative distance between the location card 500 and the other location card according to an arrival time of the third signal and a sending time of the indication signal, reference may be made to related description in step 100d.

The third signal generating unit 506 may be further configured to determine the identification information of the other location card according to the second signal, and generate the third signal according to the identification information of the other location card, the identification information of the location card 500, and the second signal, or generate the third signal by carrying the identification information of the location card in the second signal, where the second signal carries the identification information of the other location card.

The third signal carries the identification information of the location card 500 and the identification information of the other location card, and for specific description, reference may be made to step 303.

For details of determining a relative distance between the location card 500 and the other location card according to an arrival time of the third signal and a sending time of the indication signal, reference may be made to related description in step 100d.

The second signal may be an ultrasonic wave signal or electromagnetic wave signal.

The identification information may include RF ID or Cell ID.

It should be noted that, the foregoing location card 500 may be configured to perform the method of the embodiment shown in FIG. 1, or steps performed by the first and second location cards in the embodiment shown in FIG. 3, where related description of the steps in the embodiment shown in FIG. 1 or FIG. 3 is likewise applicable to this embodiment, and is not described again.

The location card 500 provided in this embodiment of the present disclosure detects an uplink signal sent by UE, generates a first signal carrying an identification of the location card according to the uplink signal, and sends the first signal to a reader such that the reader determines a location of the UE according to the first signal and a location of the location card, which not only can greatly simplify a method for positioning UE in other approaches, but also can identify the location of the UE more accurately.

Figure 6A:
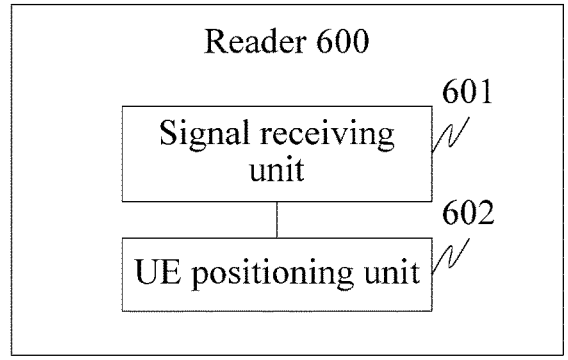
FIG. 6A is a structural block diagram of a reader according to an embodiment of the present disclosure.

As shown in FIG. 6A, this embodiment provides a reader 600, where the reader 600 is applied to a communications system, the communications system further includes a location card and a signal transmission point, and the reader 600 includes a signal receiving unit 601 and a UE positioning unit 602.

The signal receiving unit 601 is configured to receive a first signal sent by the location card, where the first signal is generated by the location card according to an uplink signal sent by UE, and the first signal carries identification information of the location card.

The UE positioning unit 602 is configured to determine a location of the UE according to the first signal received by the signal receiving unit 601 and a location of the location card.

The signal receiving unit 601 may be a pulse detector.

The UE positioning unit 602 may be further configured to determine a first distance between the location card and the UE according to a signal strength of the first signal, and determine the location of the UE according to the first distance and the location of the location card, or obtain the location of the location card according to the first signal, and determine the location of the UE according to the location of the location card and a location of at least one location card except the location card, where the at least one location card is a location card that successfully detects the uplink signal of the UE and sends, according to the uplink signal, a signal to the reader, or obtain the location of the location card according to the first signal, and determine the location of the UE according to a movement track of the UE and the location of the location card.

Figure 6B:
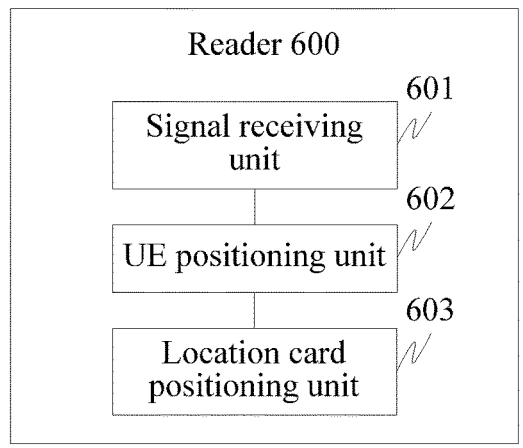
FIG. 6B is a structural block diagram of another reader according to an embodiment of the present disclosure.

Optionally, as shown in FIG. 6B, the reader 600 further includes a location card positioning unit 603 configured to obtain the location of the location card.

The location card positioning unit 603 may be further configured to send an indication signal, where the indication signal is used for instructing another location card to send a second signal, receive a third signal sent by the location card, where the third signal carries the identification information of the location card and identification information of the other location card, and the third signal is generated by the location card according to the second signal sent by the other location card, determine a relative distance between the location card and the other location card according to an arrival time of the third signal and a sending time of the indication signal, and determine the location of the location card according to an actual distance between the other location card and any location card except the location card and the other location card.

For determining a relative distance between the location card and the other location card according to an arrival time of the third signal and a sending time of the indication signal, reference may be made to related description in step 100d.

Optionally, the reader 600 further includes a first sending unit (not shown) configured to send a notification message to a network side device according to a quantity of location cards that successfully detect the uplink signal and send a signal to the reader according to the uplink signal, where the notification message is used for instructing the network side device to adjust a transmit power of the UE, or send, to a network side device, the signal sent by the location card that successfully detects the uplink signal such that the network side device adjusts a transmit power of the UE according to the signal sent by the reader.

Figure 6C:
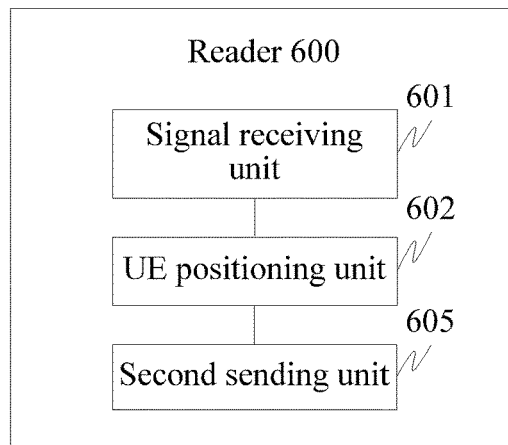
FIG. 6C is a structural block diagram of still another reader according to an embodiment of the present disclosure.

Optionally, as shown in FIG. 6C, the reader 600 further includes a second sending unit 605 configured to send location information of the UE determined by the UE positioning unit 602 to the network side device.

It should be noted that, the reader 600 may be configured to perform the method in the embodiment shown in FIG. 2, where related description of the steps in the embodiment shown in FIG. 2 is likewise applicable to this embodiment.

The reader 600 provided in this embodiment of the present disclosure receives a first signal sent by a location card and carrying an identification of the location card, and determines a location of UE according to the identification of the location card carried in the first signal and a location of the location card, which not only can greatly simplify a method for positioning UE in other approaches, but also can identify the location of the UE more accurately.

Figure 7:
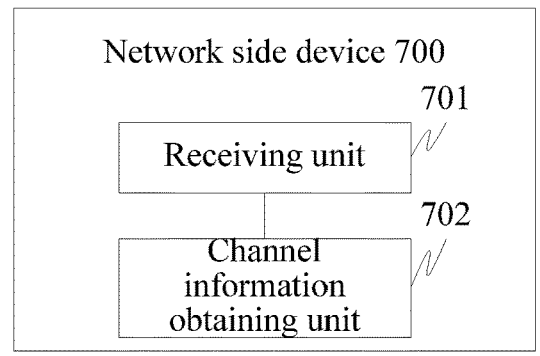
FIG. 7 is a structural block diagram of a network side device according to an embodiment of the present disclosure.

As shown in FIG. 7, a network side device 700 provided in this embodiment includes a receiving unit 701, a channel information obtaining unit 702 and a UE positioning unit (not shown).

The receiving unit 701 is configured to receive an uplink signal sent by UE.

The channel information obtaining unit 702 is configured to obtain channel information of the UE according to the uplink signal received by the receiving unit 701.

The channel information may include RSRP or CSI.

The UE positioning unit is configured to determine a location of the UE according to the channel information of the UE obtained by the channel information obtaining unit 702 and a preset correspondence between channel information and location information.

Further, the UE positioning unit may be further configured to receive location information of the UE sent by a reader, where the location information is determined by the reader according to a first signal sent by a location card, and the first signal is generated by the location card according to the uplink signal sent by the UE, and determine the location of the UE according to the location information, the channel information of the UE and the preset relationship between channel information and location information.

It should be noted that, the network side device 700 may be configured to perform the method in the embodiment shown in FIG. 4, where related description of the steps in the embodiment shown in FIG. 4 is likewise applicable to this embodiment.

The network side device 700 provided in this embodiment of the present disclosure determines channel information of UE according to an uplink signal of the UE, and then determines a location of the UE according to the channel information of the UE and a preset correspondence between channel information and location information, and the method further simplifies the method for positioning UE in the prior art.

Figure 8:
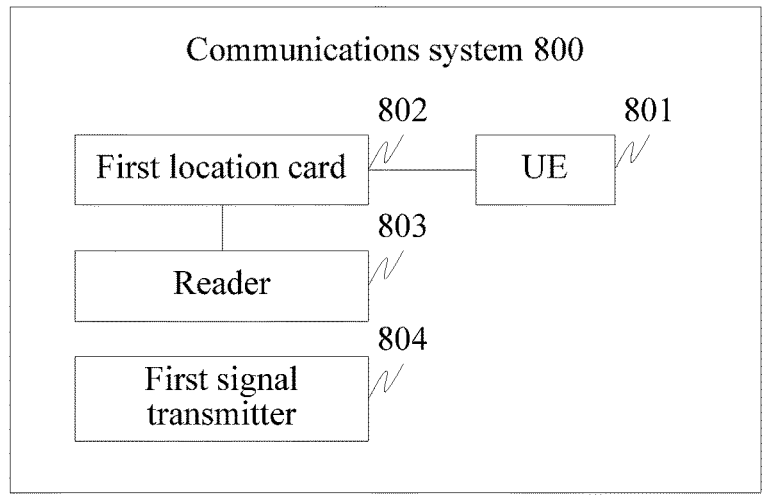
FIG. 8 is a schematic diagram of a communications system according to an embodiment of the present disclosure.

As shown in FIG. 8, a communications system 800 provided in this embodiment includes UE 801, a first location card 802, a reader 803 and a first signal transmitter 804.

The first location card 802 is configured to receive an uplink signal sent by the UE 801, generate a first signal according to the uplink signal, and send the first signal to the reader 803.

The first signal carries identification information of the first location card 802, and the first signal is used for instructing the reader 803 to determine a location of the UE 801 according to the first signal and a location of the first location card 802.

The reader 803 is configured to receive the first signal sent by the first location card 802, and determine the location of the UE 801 according to the first signal and the location of the first location card 802.

Location cards and signal transmitters in the communications system 800 may be in a one-to-one correspondence, or may be not corresponding to each other, for example, the first location card 802 and the first signal transmitter 804 are corresponding to each other, and the first location card 802 may be placed inside or placed outside the first signal transmitter 804.

Optionally, as shown in FIG. 8, the communications system 800 further includes a network side device (not shown) configured to receive the uplink signal sent by the UE 801, determine channel information of the UE 801 according to the uplink signal, and determine the location of the UE 801 according to the channel information of the UE 801 and a preset correspondence between channel information and location information.

The channel information may include RSRP or CSI.

Further, after location information of the UE 801 is found according to the preset correspondence between channel information and location information, the location information of the UE 801 obtained by means of search is then corrected according to location information sent by the reader 803. The correction manner may be an average method.

It should be noted that, the preset correspondence between channel information and location information may be obtained by associating the location information of the UE 801 reported by the reader 803 with the channel information and saving the association.

The network side device may be further configured to receive location information of the UE 801 sent by the reader 803, and determine the location of the UE 801 according to the location information, the channel information of the UE 801 and a preset relationship between channel information and location information.

Optionally, as shown in FIG. 8, the communications system 800 further includes a second location card (not shown), which is further described as follows.

The reader 803 is further configured to send an indication signal, where the indication signal is used for instructing a location card to send a signal.

The foregoing location cards may include all location cards in a signal coverage area of the reader 803.

The first location card 802 is further configured to receive the indication signal sent by the reader 803, and send a second signal to the second location card.

The second location card is configured to receive the second signal sent by the first location card 802, generate a third signal according to the second signal, and send the third signal to the reader 803.

The third signal carries identification information of the first location card 802 and identification information of the second location card, and the third signal is used for instructing the reader 803 to determine, according to an arrival time of the third signal and a sending time of the indication signal, a relative distance between the first location card 802 and the second location card.

The reader 803 is further configured to receive the third signal sent by the second location card, determine a relative distance between the first location card 802 and the second location card according to an arrival time of the third signal and a sending time of the indication signal, and determine the location of the first location card 802 according to an actual distance between the first location card 802 and any location card except the second location card.

For determining, by the reader 803, a relative distance between the first location card 802 and the second location card according to an arrival time of the third signal and a sending time of the indication signal, reference may be made to related description in step 100d.

It should be noted that, the first location card 802 may be configured to perform the method in the embodiment shown in FIG. 1 or FIG. 3. The reader 803 may be configured to perform the method in the embodiment shown in FIG. 2. The network side device may be configured to perform the method in the embodiment shown in FIG. 4. The second location card may be configured to perform the steps performed by the second location card in the embodiment shown in FIG. 3, which are not described herein again.

In the communications system 800 provided in this embodiment of the present disclosure, a first location card 802 sends a first signal carrying an identification of the first location card 802 to a reader 803 according to a received uplink signal sent by UE 801, and the reader 803 determines a location of the UE 801 according to the first signal and a location of the first location card 802, which not only can greatly simplify a method for positioning UE 801 in other approaches, but also can improve accuracy of UE 801 positioning.

Figure 9:
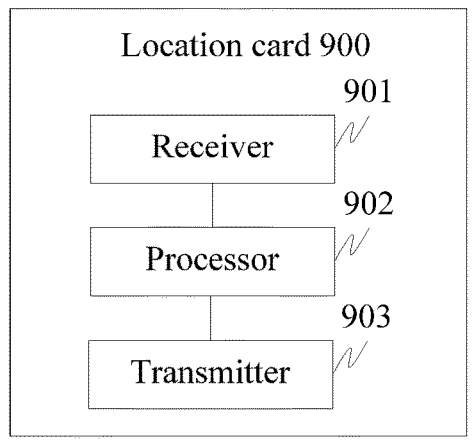
FIG. 9 is a structural block diagram of hardware of a location card according to an embodiment of the present disclosure.

As shown in FIG. 9, this embodiment provides a location card 900, where the location card 900 is applied to a communications system, the communications system further includes a signal transmission point and a reader, and the location card 900 includes a receiver 901, a processor 902 and a transmitter 903.

The receiver 901 is configured to receive and detect an uplink signal sent by UE.

The processor 902 is configured to generate a first signal according to the uplink signal detected by the receiver 901.

The transmitter 903 is configured to send the first signal generated by the processor 902 to the reader.

The first signal carries identification information of the location card 900, and the first signal is used for instructing the reader to determine a location of the UE according to the first signal and a location of the location card 900.

The first signal may be a pulse signal or non-pulse signal that can reflect a strength of the uplink signal, or may be a signal whose signal amplitude is a preset value, for example, a relationship between a pulse amplitude of the first signal and a signal strength of the uplink signal may be a preset proportional relationship, which is not limited herein.

Optionally, the receiver 901 is further configured to receive an indication signal sent by the reader, where the indication signal is used for instructing the location card 900 to send a second signal. The processor 902 is further configured to generate the second signal, and the transmitter 903 is further configured to send the second signal to at least one location card except the location card 900.

Optionally, the receiver 901 is further configured to receive a second signal sent by another location card. The processor 902 is further configured to generate a third signal according to the second signal, and the transmitter 903 is further configured to send the third signal to the reader.

The third signal carries the identification information of the location card 900 and identification information of the other location card, and the third signal is used for instructing the reader to determine, according to an arrival time of the third signal and a sending time of the indication signal, a relative distance between the location card 900 and the other location card.

For determining a relative distance between the location card 900 and the other location card according to an arrival time of the third signal and a sending time of the indication signal, reference may be made to related description in step 100d.

The processor 902 may be further configured to determine the identification information of the other location card according to the second signal, and generate the third signal according to the identification information of the other location card, the identification information of the location card 900, and the second signal, or generate the third signal by carrying the identification information of the location card 900 in the second signal, where the second signal carries the identification information of the other location card.

The third signal carries the identification information of the location card and the identification information of the other location card.

The second signal may be an ultrasonic wave signal or electromagnetic wave signal, the identification information may include RF ID or Cell ID.

It should be noted that, the foregoing location card 900 may be configured to perform the method in the embodiment shown in FIG. 1 or FIG. 3, where related description of the steps in the embodiment shown in FIG. 1 or FIG. 3 is likewise applicable to this embodiment, which is not described again.

The location card 900 provided in this embodiment of the present disclosure detects an uplink signal sent by UE, generates a first signal carrying an identification of the location card according to the uplink signal, and sends the first signal to a reader such that the reader determines a location of the UE according to identification information of the location card 900 carried in the first signal and a location of the location card 900, which not only can greatly simplify a method for positioning UE in other approaches, but also can identify the location of the UE more accurately.

Figure 10:
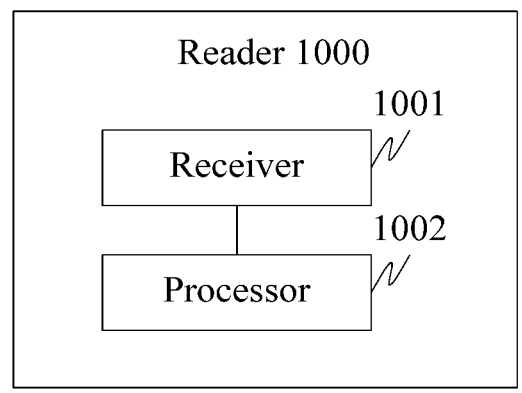
FIG. 10 is a structural block diagram of hardware of a reader according to an embodiment of the present disclosure.

As shown in FIG. 10, this embodiment of the present disclosure provides a reader 1000, where the reader 1000 is applied to a communications system, the communications system further includes a location card and a signal transmission point, and the reader 1000 includes a receiver 1001 and a processor 1002.

The receiver 1001 is configured to receive a first signal sent by the location card, where the first signal is generated by the location card according to an uplink signal sent by UE, and the first signal carries identification information of the location card.

The processor 1002 is configured to determine a location of the UE according to the first signal received by the receiver 1001 and a location of the location card.

The receiver 1001 may be a pulse detector.

The processor 1002 may be further configured to determine a first distance between the location card and the UE according to a signal strength of the first signal, and determine the location of the UE according to the first distance and the location of the location card, or if the reader 1000 receives signals sent by at least one location card except the location card, and the signals are all generated according to the uplink signal sent by the UE, determine the location of the UE according to the location of the location card and a location of the at least one location card.

Optionally, the processor 1002 may be further configured to obtain the location of the location card.

Further, obtaining the location of the location card may include sending an indication signal, where the indication signal is used for instructing another location card to send a second signal, receiving a third signal sent by the location card, where the third signal carries the identification information of the location card and identification information of the other location card, and the third signal is generated by the location card according to the second signal sent by the other location card, determining a relative distance between the location card and the other location card according to an arrival time of the third signal and a sending time of the indication signal, and determining the location of the location card according to an actual distance between the other location card and any location card except the location card and the other location card.

For determining a relative distance between the location card and the other location card according to an arrival time of the third signal and a sending time of the indication signal, reference may be made to related description in step 100*d*.

Optionally, the reader 1000 further includes a transmitter (not shown) configured to send location information of the UE determined by the processor 1002 to a network side device.

It should be noted that, the reader 1000 may be configured to perform the method in the embodiment shown in FIG. 2, where related description of the steps in the embodiment shown in FIG. 2 is likewise applicable to this embodiment.

The reader 1000 provided in this embodiment of the present disclosure receives a first signal sent by a location card and carrying an identification of the location card, and determines a location of UE according to the first signal and a location of the location card, which not only can greatly simplify a method for positioning UE in other approaches, but also can improve accuracy of UE positioning.

Figure 11:
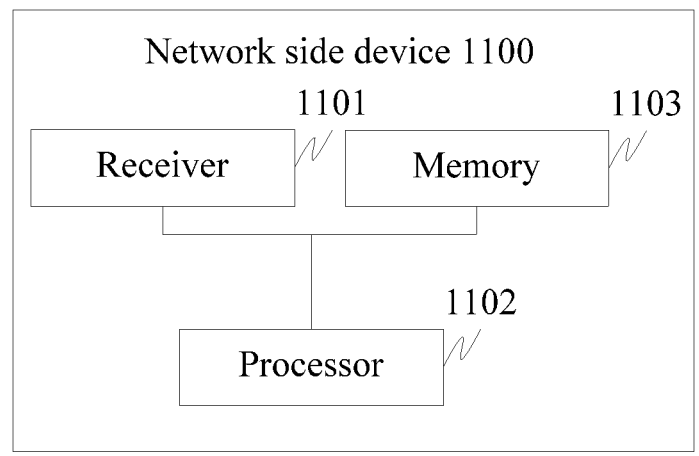
FIG. 11 is a structural block diagram of hardware of a network side device according to an embodiment of the present disclosure.

As shown in FIG. 11, a network side device 1100 provided in this embodiment of the present disclosure includes a receiver 1101, a processor 1102 and a memory 1103.

The receiver 1101 is configured to receive an uplink signal sent by UE.

The processor 1102 is configured to obtain channel information of the UE according to the uplink signal received by the receiver 1101.

The channel information may include RSRP or CSI.

The processor 1102 is further configured to determine a location of the UE according to the obtained channel information of the UE and a preset correspondence between channel information and location information stored in the memory 1103.

The processor 1102 may be further configured to receive location information of the UE sent by a reader, where the location information is determined by the reader according to a first signal sent by a location card, and the first signal is generated by the location card according to the uplink signal sent by the UE, and determine the location of the UE according to the location information, the channel information of the UE and the preset relationship between channel information and location information.

It should be noted that, the network side device 1100 may be configured to perform the method in the embodiment shown in FIG. 4, where related description of the steps in the embodiment shown in FIG. 4 is likewise applicable to this embodiment.

The network side device provided in this embodiment of the present disclosure determines channel information of UE according to an uplink signal of the UE, and then determines a location of the UE according to the channel information of the UE and a preset correspondence between channel information and location information, and the method further simplifies the method for positioning UE in other approaches.

A communications system provided in this embodiment of the present disclosure may include a location card 900 shown in FIG. 9, and a reader 1000 shown in FIG. 10.

Optionally, the communications system may further include a network side device 1100 shown in FIG. 11.

A person of ordinary skill in the art may understand that all or a part of the steps of the method embodiments may be implemented by a program instructing relevant hardware. The program may be stored in a computer readable storage medium. The steps of the method embodiments are performed when the program runs. The foregoing storage medium includes any medium that can store program code, such as a read-only memory (ROM), a random access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for positioning user equipment (UE), the method being applied to a communications system, the communications system comprising a location card and a reader, and the method comprising:

detecting, by the location card, an uplink signal from the UE;

generating, by the location card, a first signal according to the uplink signal, the first signal comprising a pulse signal having an amplitude, the amplitude of the pulse signal being based on a preset proportional relationship with a strength of the uplink signal, the amplitude of the pulse signal being increased when the strength of the uplink signal increases, and the amplitude of the pulse signal being decreased when the strength of the uplink signal decreases;

sending, by the location card, the first signal to the reader, the first signal carrying identification information of the location card, and the first signal instructing the reader to determine a location of the UI according to the identification information of the location card, the amplitude of the pulse signal, and a location of the location card; and sending, by the reader, a notification message to a network side device to adjust a transmit power of the UE based on a number of location cards that detect the uplink signal from the UE, the notification message being used to increase the transmit poser of the UE when the number of location cards that detect the uplink signal from the UE is less than a preset first threshold, and the notification message being used to decrease the transmit power of the UE when the number of location cards that detect the uplink signal from the UE is greater than a preset second threshold.

2. The method of claim 1, wherein generating the first signal comprises generating, by the location card, the first signal according to the pulse signal and the identification information of the location card.

3. The method of claim 1, further comprising:
receiving, by the location card, an indication signal from the reader, the indication signal instructing the location card to send a second signal; and
sending, by the location card, the second signal to at least one location card except the location card.

4. The method of claim 3, further comprising:
receiving, by another location card, the second signal from the location card;
generating, by the other location card, a third signal according to the second signal; and
sending the third signal to the reader, the third signal carrying the identification information of the location card and identification information of the other location card, and the third signal instructing the reader to determine, according to an arrival time of the third signal and a sending time of the indication signal, a relative distance between the location card and the other location card.

5. A method for positioning user equipment (UE), the method being applied to a communications system, the communications system comprising a location card and a reader, and the method comprising:
receiving, by the reader, a first signal from the location card, the first signal being generated by the location card according to an uplink signal from the UE, the first signal carrying identification information of the location card, the first signal comprising a pulse signal having an amplitude, and the amplitude of the pulse signal being based on a preset proportional relationship with a strength of the uplink signal;
determining, by the reader, a location of the UE according to the identification information of the location card, the amplitude of the pulse signal, and a location of the location card, the reader determining the location of the UE based on the amplitude of the pulse signal increasing when the strength of the uplink signal increases and the amplitude of the pulse signal decreasing when the strength of the uplink signal decreases; and
sending, by the reader, a notification message to a network side device to adjust a transmit power of the UE based on a number of location cards that detect the uplink signal from the UE, the notification message being used to increase the transmit power of the UE when the number of location cards that detect the uplink signal from the UE is less than a preset first threshold, and the notification message being used to decrease the transmit power of the UE when the number of location cards that detect the uplink signal from the UE is greater than a preset second threshold.

6. The method of claim 5, wherein determining the location of the UE comprises:
determining, by the reader, a first distance between the location card and the UE according to a signal strength of the first signal, and determining the location of the UE according to the first distance and the location of the location card;
obtaining, by the reader, the location of the location card according to the first signal, and determining the location of the UE according to the location of the location card and a location of at least one location card except the location card, the at least one location card being a location card that successfully detects the uplink signal of the UE and sends, according to the uplink signal, a signal to the reader; or
obtaining, by the reader, the location of the location card according to the first signal, and determining the location of the UE according to a movement track of the UE and the location of the location card.

7. The method of claim 5, wherein before receiving the first signal from the location card, the method further comprises obtaining, by the reader, the location of the location card.

8. The method of claim 5, further comprising sending, by the reader, location information of the UE to a network side device.

9. A device for positioning user equipment (UE), the device comprising a location card, the location card applied to a communications system, the communications system further comprising a reader, and the location card comprising:
a receiver configured to receive and detect an uplink signal from the UE;
a processor coupled to the receiver and configured to generate a first signal according to the uplink signal detected by the receiver, the first signal comprising a pulse signal having an amplitude, the amplitude of the pulse signal being based on a preset proportional relationship with a strength of the uplink signal, the amplitude of the pulse signal being increased when the strength of the uplink signal increases, and the amplitude of the pulse signal being decreased when the strength of the uplink signal decreases; and
a transmitter coupled to the processor and configured to:
send the first signal generated by the processor to the reader, the first signal carrying identification information of the location card, and the first signal instructing the reader to determine a location of the UE according to the identification information of the location card, the amplitude of the pulse signal, and a location of the location card; and
send a notification message to adjust a transmit power of the UE based on a number of location cards that detect the uplink signal from the UE, the notification message being used to increase the transmit power of the UE when the number of location cards that detect the uplink signal from the UE is less than a preset first threshold, and the notification message being used to decrease the transmit power of the UE when the number of location cards that detect the uplink signal from the UE is greater than a preset second threshold.

10. The device of claim 9, wherein the receiver is further configured to receive an indication signal from the reader, the indication signal instructing the location card to send a second signal, the processor being further configured to generate the second signal, and the transmitter being further configured to send the second signal to another location card.

11. The device of claim 10, wherein the receiver is further configured to receive the second signal from the location card, the processor being further configured to generate a third signal according to the second signal, the transmitter being further configured to send the third signal to the reader, the third signal carrying the identification information of the location card and identification information of the other location card, and the third signal instructing the reader to determine, according to an arrival time of the third signal and a sending time of the indication signal, a relative distance between the location card and the other location card.

12. The device of claim 11, wherein the processor is further configured to:
determine the identification information of the other location card according to the second signal, and generate the third signal according to the identification information of the other location card, the identification information of the location card, and the second signal; or
generate the third signal by carrying the identification information of the location card in the second signal, the second signal carrying the identification information of the other location card, and the third signal carrying the identification information of the location card and the identification information of the other location card.

13. A device for positioning user equipment (UE), the device comprising a reader, the reader being applied to a communications system, the communications system further comprising a location card, and the reader comprising:
a receiver configured to receive a first signal from the location card, the first signal being generated by the location card according to an uplink signal from the UE, the first signal carrying identification information of the location card, the first signal comprising a pulse signal having an amplitude, and the amplitude of the pulse signal being based on a preset proportional relationship with a strength of the uplink signal; and
a processor coupled to the receiver and configured to:
determine a location of the UE according to the first signal received by the receiver and a location of the location card, the reader determining the location of the UE based on the amplitude of the pulse signal increasing when the strength of the uplink signal increases and the amplitude of the pulse signal decreasing when the strength of the uplink signal decreases; and
send a notification message to a network side device to adjust a transmit power of the UE based on a number of location cards that detect the uplink signal from the UE, the notification message being used to increase the transmit power of the UE when the number of location cards that detect the uplink signal from the UE is less than a preset first threshold, and the notification message being used to decrease the transmit power of the UE when the number of location cards that detect the uplink signal from the UE is greater than a preset second threshold.

14. The device of claim 13, wherein the processor is further configured to:
determine a first distance between the location card and the UE according to a signal strength of the first signal, and determine the location of the UE according to the first distance and the location of the location card;
obtain the location of the location card according to the first signal, and determine the location of the UE according to the location of the location card and a location of at least one location card except the location card, the at least one location card being a location card that successfully detects the uplink signal of the UE and sends, according to the uplink signal, a signal to the reader; or
obtain the location of the location card according to the first signal, and determine the location of the UE according to a movement track of the UE and the location of the location card.

15. The device of claim 13, wherein the processor is further configured to obtain the location of the location card.

16. The device of claim 15, wherein when obtaining the location of the location card, the processor is further configured to:
send an indication signal, the indication signal instructing another location card to send a second signal;
receive a third signal from the location card, the third signal carrying the identification information of the location card and identification information of the other location card, and the third signal being generated by the location card according to the second signal from the other location card;
determine a relative distance between the location card and the other location card according to an arrival time of the third signal and a sending time of the indication signal; and
determine the location of the location card according to an actual distance between the other location card and any location card except the location card and the other location card.

17. The device of claim 13, wherein the transmitter is further configured to send location information of the UE determined by the processor to a network side device.

* * * * *

UNITED STATES PATENT AND TRADEMARK OFFICE
CERTIFICATE OF CORRECTION

PATENT NO. : 10,149,270 B2
APPLICATION NO. : 15/395510
DATED : December 4, 2018
INVENTOR(S) : Yi Zhang Page 1 of 1

It is certified that error appears in the above-identified patent and that said Letters Patent is hereby corrected as shown below:

In the Claims

Column 24, Line 67: "UI" should read "UE"

Column 25, Line 8: "poser" should read "power"

Signed and Sealed this
Twelfth Day of February, 2019

Andrei Iancu
*Director of the United States Patent and Trademark Office*